June 15, 1965   G. D. ARNOLD   3,189,200
FEEDING CONVEYOR SYSTEM WITH UNIFORMITY CONTROL
Filed Aug. 15, 1963   4 Sheets-Sheet 1
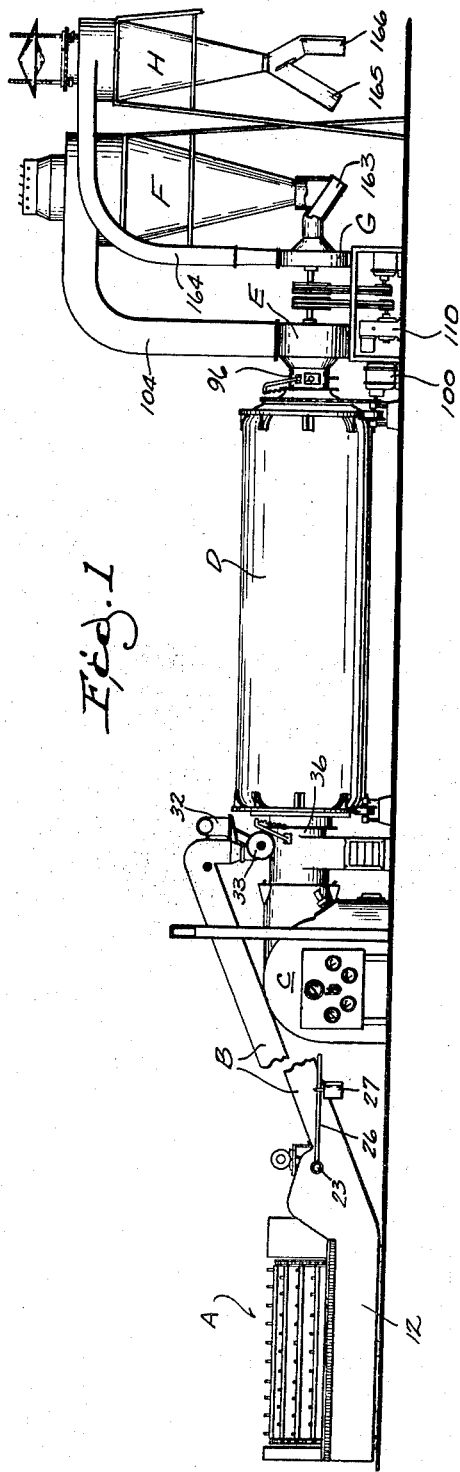
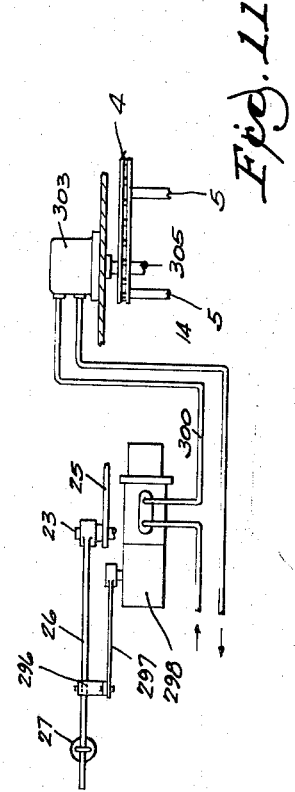
INVENTOR.
GERALD D. ARNOLD
BY
Wheeler, Wheeler & Wheeler
ATTORNEYS June 15, 1965
G. D. ARNOLD
3,189,200
FEEDING CONVEYOR SYSTEM WITH UNIFORMITY CONTROL
Filed Aug. 15, 1963
4 Sheets-Sheet 2
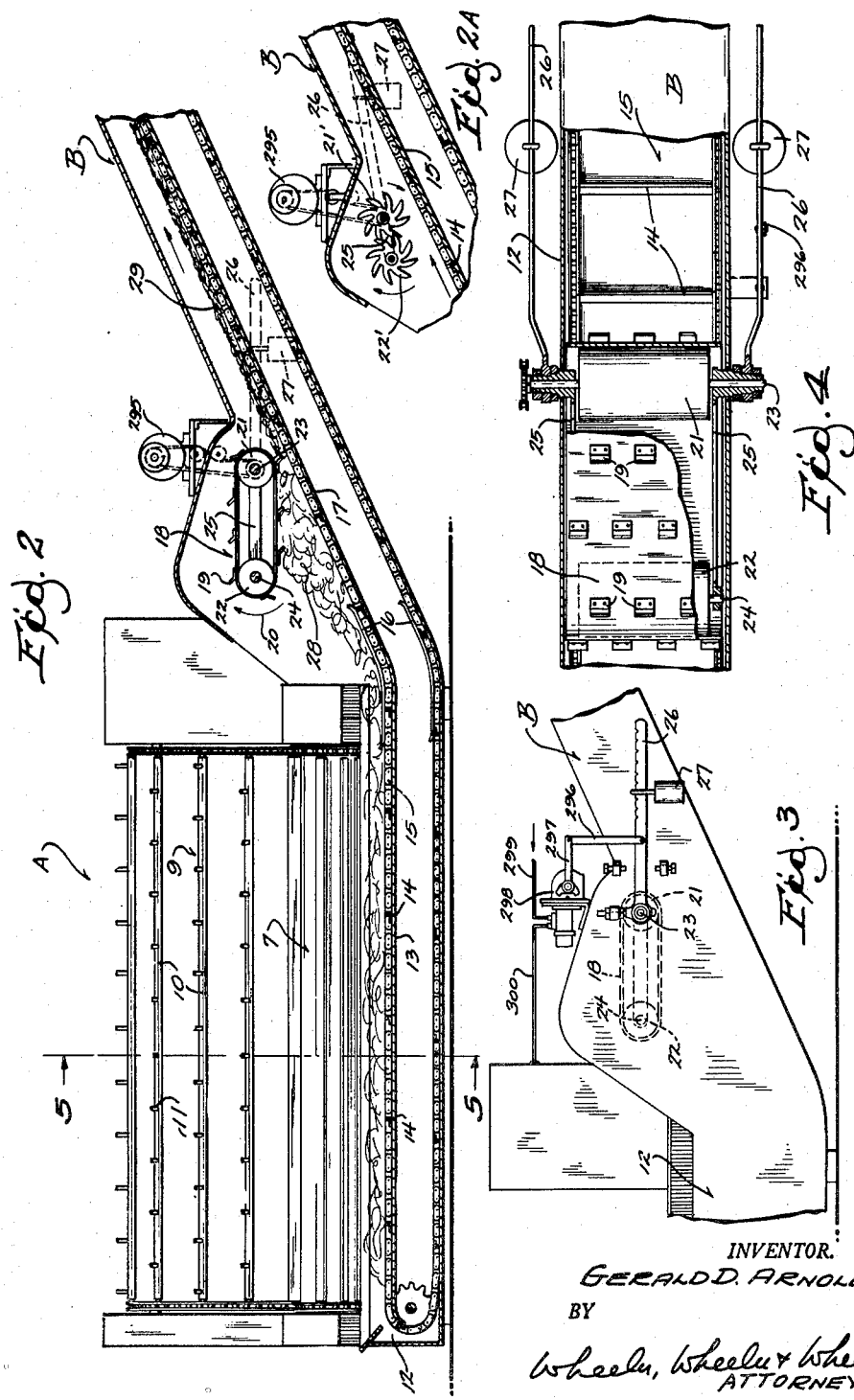
INVENTOR.
GERALD D. ARNOLD
BY
Wheeler, Wheeler & Wheeler
ATTORNEYS

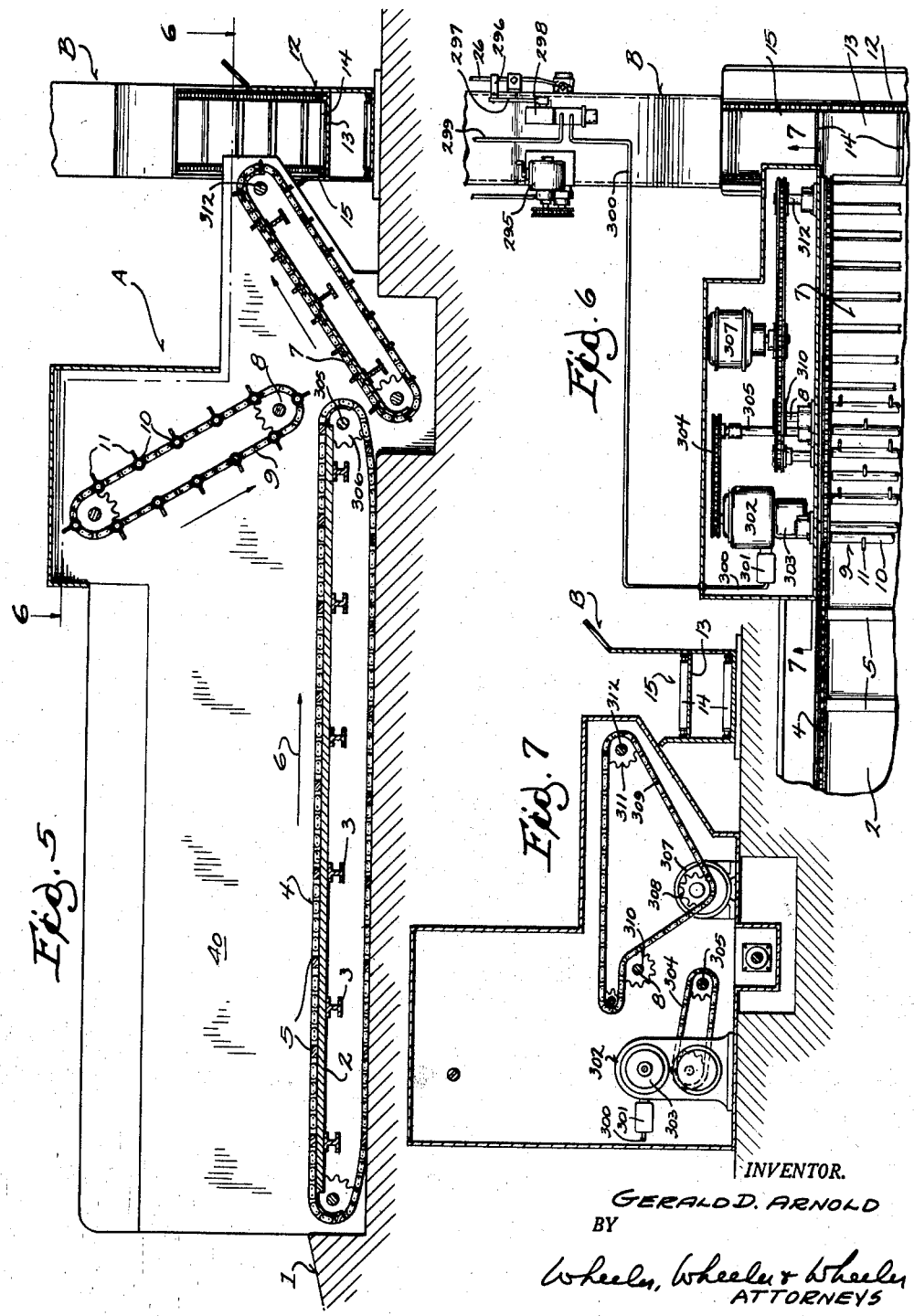

June 15, 1965 G. D. ARNOLD 3,189,200
FEEDING CONVEYOR SYSTEM WITH UNIFORMITY CONTROL
Filed Aug. 15, 1963 4 Sheets-Sheet 4
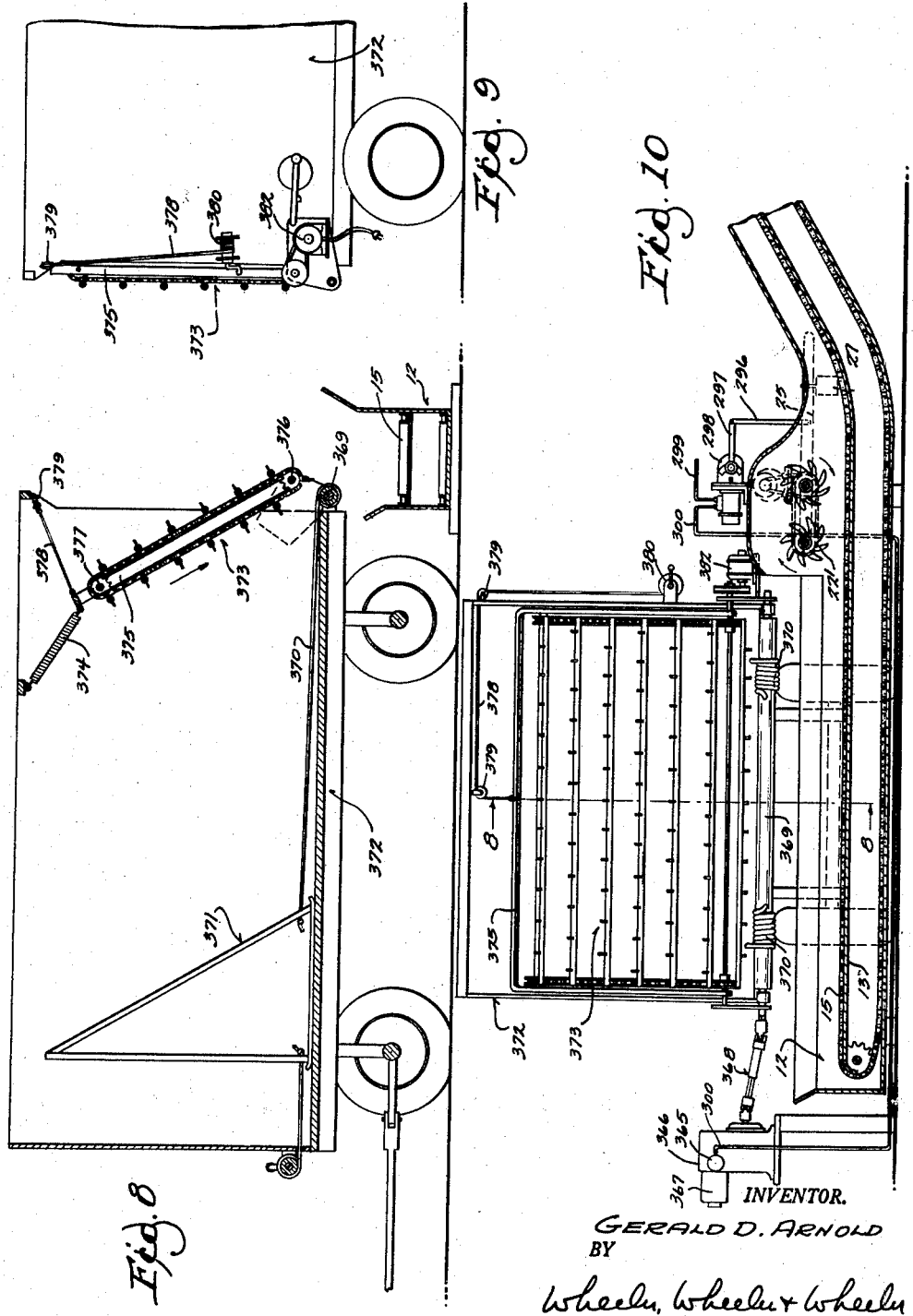
INVENTOR.
GERALD D. ARNOLD
BY
Wheeler, Wheeler & Wheeler
ATTORNEYS

United States Patent Office 3,189,200
Patented June 15, 1965

3,189,200
FEEDING CONVEYOR SYSTEM WITH
UNIFORMITY CONTROL
Gerald D. Arnold, Galesville, Wis.
Filed Aug. 15, 1963, Ser. No. 302,238
7 Claims. (Cl. 214—46)

This application relates to an agricultural dehydrating system. Included are improvements in the feeder, the furnace, and the controls which automatically regulate the operation of the system as a whole and cooperate with the various improvements in the specific parts thereof. The present application is a continuation in part of my application 692,833, filed October 28, 1957, Patent 3,102,794 of September 3, 1963, and contains subject matter divided therefrom. Application 692,833 was a division of my application 329,255, filed January 2, 1953, now Patent 2,822,153.

The feeding arrangements include means whereby the material to be dried can be delivered into the dryer on on or more than one consecutively operating conveyors, at least one of which is variable as to speed and automatically regulated by the control system. Desirably included are coacting sets of conveyors for assuring uniformity of flow of material at whatever rate is determined by the control system. Uniformity of drying is dependent on uniformity of feeding and it is therefore extremely important that the control system accurately maintain uniformity of feed of the material into the dehydrator.

In the drawings:

FIG. 1 is a view in side elevation of a dehydrating system embodying my invention.

FIG. 2 is an enlarged detail view partially in section and partially in side elevation of the feeder shown in FIG. 1.

FIG. 2A is a view similar to FIG. 2 showing a slightly modified feeding control arrangement.

FIG. 3 is an enlarged fragmentary detail view in side elevation of portions of the feeding mechanism which appear in section in FIG. 2.

FIG. 4 is a fragmentary view partially in plan and partially in horizontal section of apparatus shown in FIG. 3 and FIG. 2.

FIG. 5 is a detail view taken in section on the line 5—5 of FIG. 2.

FIG. 6 is a detail view taken in section on the line 6—6 of FIG. 5.

FIG. 7 is a detail view taken in section on the line 7—7 of FIG. 6.

FIG. 8 is a view in longitudinal section through a modified feeding conveyor arrangement in which controls similar to those heretofore shown are here employed to control the functioning of a self-unloading vehicle, the latter being illustrated in side elevation.

FIG. 9 is a fragmentary view in side elevation of the back side of the self-unloading vehicle shown in FIG. 8.

FIG. 10 is a view in end elevation of the apparatus shown in FIG. 8 as viewed from the right in FIG. 8.

FIG. 11 is a diagram of a slightly modified hydraulic drive for the operation of the input conveyor at controlled speeds.

The general organization of the dehydrator comprises a receiver A, feeding conveyor B, furnace C, dehydrating drum D, blower fan E, cyclone separator F, blower fan G, and cyclone separator and bagger H, all as shown in FIG. 1.

The receiver A and many of its component parts are illustrated on sheets 2 and 3 in FIGS. 2 to 7 inclusive. Referring to FIG. 5, truckloads of produce to be dried can be driven up the ramp 1 onto a platform 2 supported by beams 3 of such strength as to support the truck and its load. Operating over the platform is a conveyor 4 on which material is confined by sides 40 and which operates sufficiently slowly so that its cross slats 5 can be forced beneath the truck wheels without being arrested thereby. The speed of operation of conveyor 4 is controlled by means hereinafter described to effect delivery onto the infeed conveyor B at approximately a constant rate. The produce is dumped onto the platform 2, is delivered rearwardly by the conveyor in the direction of arrow 6, and discharged onto an upwardly inclined conveyor apron 7. In reaching this point, the material passes below the lower guide sprocket 8 of a relatively fast moving conveyor 9 which includes cross bars 10 having projecting fingers 11 for loosening up the material and distributing it on conveyor apron 7.

The material is discharged from conveyor apron 7 into the feed conveyor trough 12 onto the table 13, this being traversed by the upper flight 14 of conveyor 15. The table 13 is substantially horizontal for the full width of apron 7, as best shown in FIG. 2. Beyond such apron, the conveyor chains pass beneath guides 16 and the table extends upwardly at an incline as shown at 17. Material carried upwardly upon table portion 17 by conveyor 15 is leveled off to uniform depth by conveyor 18 which may comprise an apron as best shown in FIGS. 2 and 4 provided with projecting lugs 19 having a rearward rake with respect to the direction of conveyor movement indicated by the arrow 20. This conveyor operates over pulleys 21 and 22 on shafts 23 and 24, respectively. A conveyor frame 25 connecting such shafts is pivoted coaxially with shaft 23 and counterbalanced, externally of trough 12, by arms 26 upon which counterbalancing weights 27 are longitudinally adjustable as best shown in FIGS. 2, 3 and 4. This arrangement leaves pulley 22 floating, so that it may readily rise when the produce accumulates beneath it in the manner indicated at 28 in FIG. 2. The resistance to upward movement of that end of conveyor frame 25 in which shaft 24 and pulley 22 are supported will obviously depend on the position of the counterweights 27. As will hereinafter be pointed out, I may use the pivotal movement of the conveyor frame, in response to accumulations at 28, to control the rate of operation of receiving conveyor 4 to the end that the feed of this conveyor will be retarded when excessive material accumulates on conveyor 15. Since all of the material on conveyor 15 must pass beneath pulley 21, and since this pulley operates on a fixed center, the material carried by conveyor 15 beyond this pulley will be reduced to a substantially uniform level as shown at 29 of FIG. 2.

Instead of pulleys 21 and 22 and belt 18, the floating frame 25 may carry the toothed rotors 21' and 22' as shown in FIG. 2A, the operation being similar to that above described.

At its upper end, conveyor B discharges into hopper 32 of the rotary charger housing 33 on flue pipe 36 which connects the furnace C with the dehydrating drum D.

The material delivered into drum D with the gases from the furnace C is dehydrated by being passed repeatedly through the gases traversing the drum as the drum is slowly turned by motor 100. The dehydrated material and the gases leave the drum through throat 96 which connect to a blower E driven by motor 110. This blower is responsible for establishing a flow of dehydrating gases through the furnace and the drum. Its discharge is connected by pipe 104 with the cyclone separator F. The material separated from the gases in separator F is picked up by another blower G having an outlet pipe 164 which delivers such material to the terminal separator H. The cool air admitted with the material in the blower G through the inlet 163 very effectively reduces temperature of the material so that when the separated material issues through the delivery spouts 165 or 166 it is cool enough for storage.

In the parent applications above identified, I have disclosed a system of automatic controls. These lower the cost of operation, increase the efficiency and insure the production of a more perfect and uniformly dried product by positive and automatic control of (a) the input of material into the dryer; (b) the supply of fuel and combustion air to the burners; (c) the temperature of the pneumatic current of dehydrating gas; (d) the volume and velocity of the current of dehydrating gas, and consequently the time for which material to be dehydrated will be exposed to the gases within the drum; and (e) the point at which separation is achieved in the cyclones, thereby compensating for changes in barometric pressure. The various controls by which regulation is automatically achieved are operated thermostatically, humidistatically, barometrically and in accordance with the moisture content of the incoming product. While automatic regulation of the infeed conveyor and charger was described in Patent 2,822,153, it never went into general use for lack of ancillary controlled devices, such as those hereinafter described, and including means for rendering substantially uniform the amount of material carried by conveyor 15 at various points along its length.

In the device of my Patent 2,822,153, it was found inadequate to merely accelerate or decelerate the rate of operation of the infeed conveyor in accordance with the rise or fall of temperature at the dehydrator outlet. If the rise was excessive, an immediate introduction of additional material was required in order that evaporation of the moisture therefrom might lower the dehydrator temperature; otherwise the material in the dehydrating drum might catch fire or at least become scorched. Unless the amount of material at all points along the infeed conveyor could be maintained substantially constant, the amount of material supplied in response to an increase in the rate of conveyor operation would not bear any predetermined relation to the outlet temperatures of the gases used in dehydration. There might be a demand for an increase in the amount of material but if the input conveyor was underloaded, a mere acceleration of the conveyor would not supply the required material.

Accordingly, the present device combines with regulated conveyor speed control a further control for assuring the maintenance of a substantially uniform layer of material on the infeed conveyor. Not only is the material prevented from building up on the infeed conveyor beyond a predetermined depth but such depth is maintained constant by controlling the speed at which material is added to the conveyor. In one embodiment of the invention shown particularly in FIGS. 8 to 10, the infeed conveyor is supplied with material from a self-unloading vehicle and the rate at which the self-unloading mechanism is operated is correlated with the depth of material on the infeed conveyor to maintain a constant level thereon.

In another embodiment of the invention, material brought from the field is discharged into a hopper in which there is a supply conveyor operating at a controlled rate regulated by the rise and fall of the levelling device which coacts with the infeed conveyor so that the delivery of material onto the infeed conveyor is maintained approximately constant. This arrangement is best shown in FIG. 5 and except for the speed control has already been described.

The pivotally mounted frame 25, counterbalanced by weight 27 on arm 26 as shown in FIGS. 2, 3 and 4, and above described, has its driving shaft 23 connected with motor 295 for the actuation of levelling conveyor 18, or the alternatively usable rotors 21', 22', in the direction indicated by the arrows in FIGS. 2 and 2A. The conveyor flights 19 in FIG. 2 and the fingers with which the rotors 21', 22' are provided in FIG. 2A serve to pull rearwardly on the elevator 15 all material in excess of the predetermined depth shown beyond the levelling devices in FIG. 2.

Any excess of material building up at 28 beneath the free floating end of the levelling frame 25 oscillates the levelling frame clockwise as the material accumulates. Any such oscillation is used to reduce the rate at which material arrives at this point. For this purpose, motion of the levelling frame is communicated through link 296 (FIG. 3) to a control lever 297 which operates the control valve 298 to admit a lesser or greater amount of fluid, which may be compressed air (but is preferably oil), from pipe 299 to pipe 300.

Pipe 300 leads to a pressure operated speed regulator 301 (FIG. 6). The speed regulator 301 adjusts the variable speed driving mechanism indicated at 302 and through which the motor 303 drives chain 304 which actuates shaft 305 carrying the driving sprocket 306 for the loading conveyor 4. If oil is used and motor 303 is an hydraulic motor, no other regulator is require, the valve-controlled line 300 being connected directly to the motor as diagrammatically shown in FIG. 11. Thus, if the supply of material accumulating at 28 behind the levelling conveyor 18 decreases, conveyor 4 will be accelerated. If the reserve material increases, conveyor 4 will be decelerated. Since the supply of material on conveyor 4 is by no means uniform, the mass accumulated at 28 beneath the floating end of conveyor frame 25 serves as a reserve from which the level on the infeed conveyor 29 is equalized.

The conveyors 7 and 9 are driven at a rate which may be constant by motor 307 through sprocket 308, chain 309 and the driven sprockets 310 and 311 on the drive shaft 8 for conveyor 9 and the drive shaft 312 for conveyor 7. Because of the equalizing effect above described, it is not necessary to have the conveyors 7 and 9 partake of the speed variation employed in driving conveyor 4.

An alternative feeding arrangement is shown in FIGS. 8–10. The conveyor 15 traverses table 13 in feed trough 12 substantially the same as in the previously described embodiments. The levelling devices of FIG. 2 or 2A may be used, that of FIG. 2A being illustrated. As the lever 25 oscillates in response to accumulations of material (or the lack thereof) beneath rotor 22' at its floating end, pressure from the supply line 299 is communicated at a greater or lesser value to the pipe 300 which, in this instance, leads to a control 365 on a speed changer 366 driven by motor 367 to operate a flexible shaft 368 detachably connected with the shaft 369 which serves as a windlass upon which ropes 370 are wound to propel the follower 371 of a self-unloading vehicle which is merely diagrammatically illustrated at 372, it being understood that any self-unloading vehicle may be used at this point. In order that delivery from the vehicle may be rendered uniformly responsive to the rate of advance of the follower 371, the vehicle is desirably provided with a conveyor 373 extending upwardly and inwardly from the rear end of the vehicle, the upper end of such conveyor desirably being adjustably floated. A spring 374 exerts a forward bias on the upper end of the pivoted carrier 375 upon which the conveyor sprockets 376 and 377 are mounted. A rope 378 fastened over pulley 379 to a windlass at 380 permits the operator to draw the upper end of carrier 375 toward a vertical position, in which position the conveyor functions substantially as a tail gate for the vehicle. When lowered and set in motion by supplying current to motor 382, this conveyor tends to effect the regulated discharge of the material by ejecting it uniformly as it arrives, so that the delivery of material into the trough will, in actual practice, depend upon the rate at which the follower 371 moves toward the rear end of the vehicle under the control of the floating lever 25 as above described. In this embodiment, as in the previously described device, the objective is to accomplish uniformity of flow on the infeed conveyor B leading to the dehydrator.

I claim:

1. In a dehydrating system, the combination with infeed conveyor means for delivering material to the system, of means for maintaining a substantially constant level of material on the conveyor means and including a floating leveler adjacent part of the conveyor means and having a portion movable to and from the adjacent part of the conveyor means, said leveler including on its said portion a leveling means movable oppositely to the conveyor means and provided with material-engaging teeth, and means for driving said leveling means for raking rearwardly of the conveyor means the material engaged by said teeth, a speed changing drive to a part of the conveyor means, and connections from such leveler portion to said speed changing drive for accelerating the last mentioned part of the conveyor means upon movement of such portion toward the first mentioned part of the conveyor means and decelerating the last mentioned part of the conveyor means upon movement of such portion from the first mentioned part of the conveyor means.

2. In a dehydrating system, an infeed conveyor for material to be dehydrated, a floating leveler above said conveyor including power-actuated means for maintaining a substantially constant bed of material on the conveyor, said leveler including a portion mounted for movement to and from the conveyor according to depth of material accumulated in front of said leveler, said leveler including on its said portion a leveling means movable oppositely to the conveyor means and provided with material-engaging teeth, and means for driving said leveling means for raking rearwardly of the conveyor means the material engaged by said teeth, means for supplying material to said infeed conveyor, means connected to be actuated by the movement of said leveler portion to regulate said supplying means to vary the flow of material toward the leveler on the conveyor.

3. A dehydrating system according to claim 2 in which such supplying means includes a material-receiving conveyor arranged to discharge onto the conveyor first mentioned and having a variable speed drive controlled by said connection.

4. A dehydrating system according to claim 2 in which said supplying means comprises a self-unloading vehicle, a speed changing drive controlled by said connections and having a detachable connection with the self-unloading vehicle for regulating the rate of unloading thereof.

5. A dehydrating system according to claim 2 in which the means for supplying material comprises another conveyor means, the said leveler-actuated means including driving connections to said other conveyor means, and means for varying the rate of operation of said driving connections, whereby to vary the operation of said other conveyor means.

6. A dehydrating system according to claim 5 in which said other conveyor means comprises a generally horizontal conveyor arranged to receive material dumped thereon.

7. A dehydrating system according to claim 5 in which said other conveyor means comprises a delivery ram on a self-unloading truck.

References Cited by the Examiner
UNITED STATES PATENTS

| | | | |
|---|---|---|---|
| 715,443 | 12/02 | Vanhouweling | 198—37 X |
| 783,821 | 2/05 | Critchfield | 198—161 |
| 881,839 | 3/08 | Appel | 108—37 X |
| 1,259,828 | 3/18 | Bronder | 198—37 X |
| 1,440,391 | 1/23 | Kane | 198—37 X |
| 1,526,704 | 2/25 | Hird | 214—83.22 X |
| 2,162,443 | 6/39 | Muller | 198—37 X |
| 2,489,594 | 11/49 | Sherman | 198—161 X |
| 2,519,089 | 8/50 | Whitaker | 198—37 X |
| 2,547,773 | 4/51 | Pittman | 214—83.22 X |
| 2,569,191 | 9/51 | Peterson et al. | 214—46 X |

HUGO O. SCHULZ, *Primary Examiner.*

GERALD M. FORLENZA, *Examiner.*